A. RINGLAND & F. H. SCHOENFUSS.
METHOD OF AND APPARATUS FOR TESTING HARDNESS.
APPLICATION FILED SEPT. 15, 1913.
1,125,912.
Patented Jan. 19, 1915.
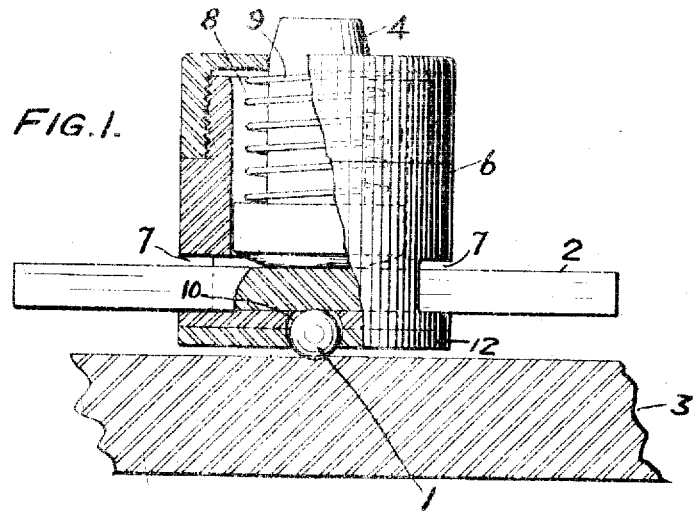
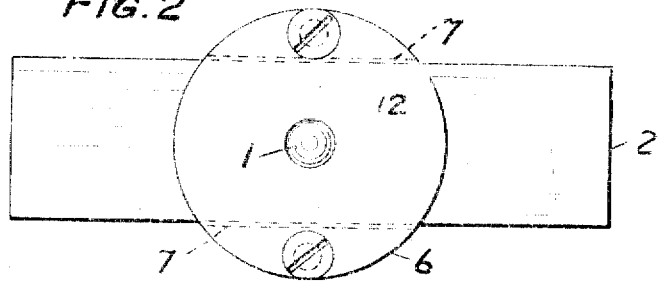
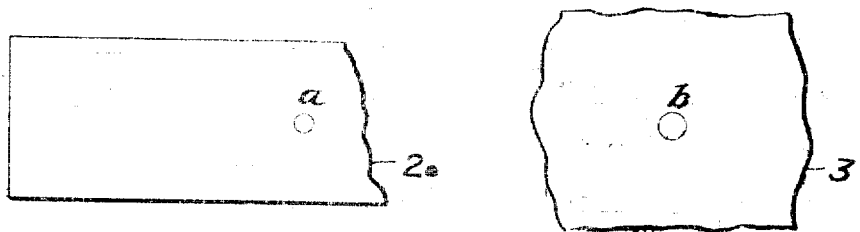
FIG.3.   FIG.4.
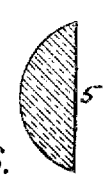
FIG.6.
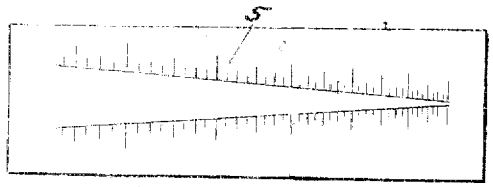
FIG.5.
WITNESSES:
INVENTORS
Albert Ringland &
Frank H. Schoenfuss
BY
Augustus B Stoughton
ATTORNEY

UNITED STATES PATENT OFFICE.

ALBERT RINGLAND AND FRANK H. SCHOENFUSS, OF PHILADELPHIA, PENNSYLVANIA, ASSIGNORS TO STANDARD ROLLER BEARING COMPANY, OF PHILADELPHIA, PENNSYLVANIA, A CORPORATION OF NEW JERSEY.

METHOD OF AND APPARATUS FOR TESTING HARDNESS.

1,125,912.   Specification of Letters Patent.   Patented Jan. 19, 1915.

Application filed September 15, 1913. Serial No. 789,798.

*To all whom it may concern:*

Be it known that we, ALBERT RINGLAND and FRANK H. SCHOENFUSS, both citizens of the United States, and residents of Philadelphia, in the county of Philadelphia and State of Pennsylvania, have jointly invented a certain new and useful Method of and Apparatus for Testing Hardness, of which the following is a specification.

The so-called "Brinell hardness" of a piece of metal, as originally devised by J. Brinell, consists in measuring the indentation produced by pressing, into the metal, a hardened steel ball of a certain size (usually 10 mm. in diameter) under a given load. From the size of ball used, the depth and width of the impression, the spherical area can be figured. The load divided by the spherical area gives a number which represents the hardness of the metal. The larger the impression the softer the metal; the smaller the impression, the harder the metal.

The principal object of the present invention is to provide for ascertaining Brinell hardness of specimens of practically any size or shape and in any place, locality or structure by means of a portable Brinell apparatus. This device permits the determination of hardness with unusually thin specimens or material. Other devices for similar purposes do not. The reason for this is that the load or pressure may be varied and yet obtain the desired results, the ratio always being the same, whereas with the usual Brinell machine a definite pressure of considerable severity must be used and does not give results, because the ball crushes through the thin material.

The invention will be claimed at the end hereof; but will be first described in connection with the embodiment, chosen from among other embodiments, and illustrated in the accompanying drawings, in which—

Figure 1, is a side view principally in central section illustrating one form of apparatus embodying features of the invention and adapted for the practice of the method of the invention. Fig. 2. is a plan view looking upward of the apparatus shown in Fig. 1. Figs. 3 and 4, are plan views, hereinafter referred to, and Figs. 5 and 6, are a plan view and a sectional view of a Brinell scale.

To practise the invention a ball 1 is placed between a standard 2 of known Brinell hardness and the piece 3 of unknown hardness to be tested. Force of unknown quantity is applied to the assemblage for example by striking a blow or exerting pressure upon the plunger 4. This produces a ball depression or indentation $a$ and $b$, in each of the pieces 2 and 3. The depressions $a$ and $b$ are then compared and from the comparison the Brinell hardness of the piece 3 to be tested is ascertained. The ball depressions indicate Brinell hardness and since the Brinell hardness of the standard piece 2 has been previously ascertained and is known a comparison of the depressions $a$ with the depressions $b$ affords means for ascertaining the Brinell hardness of the piece 3 to be tested, because the ball depressions are proportionate to the Brinell hardness. The proportion is an absolutely direct one, varying directly as the spherical areas of the two impressions, consequently varying directly as the squares of the diameters of each impression. Thus, by means of the following formula $$C = K - \frac{D^2}{(D')^2}$$

(where C equals the Brinell hardness to be determined, K the Brinell hardness of the standard piece, D the diameter of the impression on the standard piece and D' the diameter of the impression on the piece to be determined) a curve or table can be worked out, by those skilled in the art, which will give the Brinell hardness desired for any readings. One of the known ways of comparing the ball depressions $a$ and $b$ is to use the glass Brinell scale 5 in the usual manner. To illustrate, by means of the Brinell scale it may be assumed that the ball dent or depression $b$ is twice as wide as the ball dent or depression $a$. This, of course, indicates that the test piece is harder than the piece to be tested and the proportion between the width of the depression $a$ and the width of the depression $b$ affords means for ascertaining definitely, expressed in Brinell hardness, the extent to which the piece 3 is softer than the standard piece 2. The proportion as has been said is an absolutely direct one, and, accordingly, the Brinell hardness of the piece 2 is known.

Another way to use the invention is to provide a standard piece 2 to which the test piece must correspond and in that case the ball dents in each piece must be identical, when there is the desired correspondence. The hardness of the standard piece, which is of appropriate size, can be ascertained for example by means of a Schore scleroscope. Evidently the piece 3 may be of any size or shape and located in any position, for example, it might be a piece of armor plate in place upon a ship, or it might be a part of any mechanical or other structure and its hardness and strength can be readily ascertained in the manner and by the means described, because as a matter of fact all that it is necessary to do is to bring the ball 1 into contact with it and to then hit the plunger 4 a blow with a hammer and the force of the blow is immaterial because the same blow operates upon the standard as well as upon the piece to be tested. In the use of this device, attention is called to the fact that the tension of the spring 9 must be overcome before the blow is struck in order that a perfect contact may be obtained between the parts of the device and the ball upon the specimen known and unknown. In other words, all lost motion is thereby taken up before the test is made.

6, is a housing slotted as at 7 for the reception and removal of the standard piece 2 and provided with a chamber 8 for the accommodation of the plunger spring 9 arranged between the top of the housing and the head of the plunger. The ball 1 is retained but afforded freedom of movement in a pocket 10 formed between two plates 11 and 12 which constitute the bottom of the housing. The stem of the plunger 4 projects through a hole in the top of the housing.

It will be obvious that the invention is not limited in matters of details, construction and arrangement nor do we intend to limit it in any way further than the prior state of the art may require, but

What we claim is:

1. The method of ascertaining the Brinell hardness of a piece to be tested, which consists in placing a ball between said piece and a standard piece of known Brinell hardness, applying a force to the assemblage to produce a ball depression in each piece and then comparing the depressions and thereby ascertaining the Brinell hardness of the piece to be tested.

2. Apparatus for testing Brinell hardness which comprises the combination of a housing, a movable ball projecting therefrom, a detachable standard piece of known Brinell hardness accommodated by the housing and having a smooth surface contacting with said ball, and means for imparting pressure to said piece and from said piece to said ball whereby a spherical shaped depression is produced in said smooth surface.

In testimony whereof we have hereunto signed our names.

ALBERT RINGLAND.
FRANK H. SCHOENFUSS.

Witnesses:
CLIFFORD K. CASSEL,
JAMES HORROCKS.

Disclaimer.

Disclaimed in Letters Patent No. 1,125,912.

1,125,912.—*Albert Ringland* and *Frank H. Schoenfuss*, Philadelphia, Pa. METHOD OF AND APPARATUS FOR TESTING HARDNESS. Patent dated January 19, 1915. Disclaimer filed July 26, 1917, by *Marlin-Rockwell Corporation*, assignee, by mesne assignments.

Enters this disclaimer—

"To that part of the claim in said specification which is in the following words, to wit:

"Method of and," page 1, lines 7 and 8, of printed specification.

"This device permits the determination of hardness with unusually thin specimens or material. Other devices for similar purposes do not. The reason for this is that the load or pressure may be varied and yet obtain the desired results, the ratio always being the same, whereas with the usual Brinell machine a definite pressure of considerable severity must be used and does not give results, because the ball crushes through the thin material.", page 1, lines 28 to 38, inclusive, of printed specification.

"and adapted for the practice of the method of the invention.", page 1, lines 47 and 48, of the printed specification.

"1. The method of ascertaining the Brinell hardness of a piece to be tested, which consists in placing a ball between said piece and a standard piece of known Brinell hardness, applying a force to the assemblage to produce a ball depression in each piece and then comparing the depressions and thereby ascertaining the Brinell hardness of the piece to be tested." claim 1, page 2, lines 48 to 56 inclusive.

[*Official Gazette July 31, 1917.*]